Oct. 14, 1958     J. L. PARROT     2,855,920
APPARATUS FOR MEASURING THE RESISTANCE OF BLOOD VESSELS
Filed Nov. 8, 1954     2 Sheets-Sheet 1

INVENTOR
JEAN LOUIS PARROT
BY
Attys

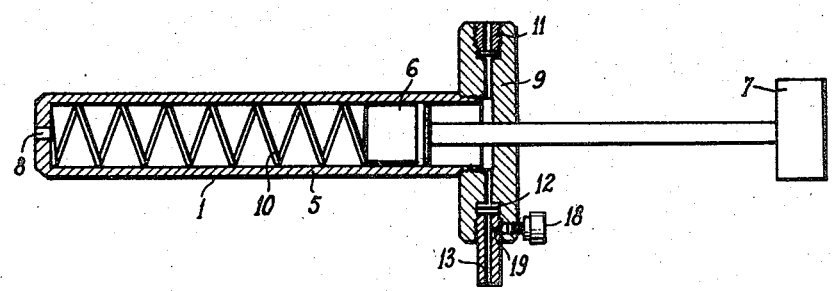
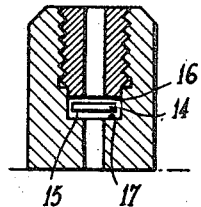
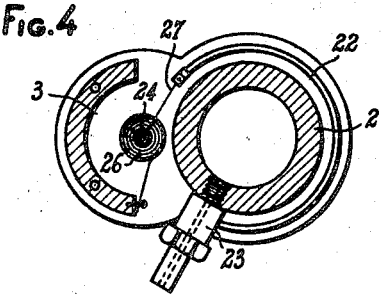
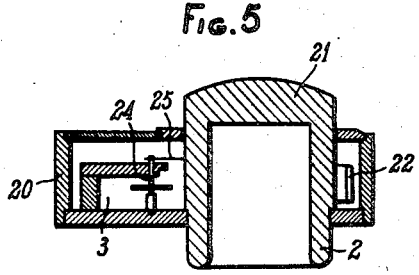

United States Patent Office 2,855,920
Patented Oct. 14, 1958

2,855,920

APPARATUS FOR MEASURING THE RESISTANCE OF BLOOD VESSELS

Jean Louis Parrot, Paris, France, assignor to "Laboratoires de Physique Medicale," Puteaux, France, a French society Application November 8, 1954, Serial No. 467,614

6 Claims. (Cl. 128—2)

This invention relates to the study of petechia and to the means for measuring the resistance of capillary blood-vessels.

It is known to measure this resistance by creating a vacuum of predetermined value over a given area of the skin. For a critical value of this vacuum, after a predetermined time period the surface capillaries are ruptured and this causes small red spots due to minute hemorrhages into the skin to appear on the skin surface.

It is the primary object of this invention to provide an appartus whereby this blood-vessel test may be simplified and improved while affording a greater accuracy of measurement than any other known apparatus.

According to one feature of this invention, the apparatus comprises in combination a pump giving the desired vacuum values up to about 600 mm. of Hg, a cup member applicable on the skin, a vacuum-gage mounted in said cup member and a flexible pipe connecting the cup member to the pump.

With this arrangement it is possible, while operating the pump at any desired or convenient location independent of the cup member position, to facilitate the examination since the operator may jointly observe the red spots as they are formed in the skin and read the vacuum value on the vacuum-gage dial.

According to another feature of this invention, the pump body comprises at one end a head through which the piston rod extends, this head enabling the pump to be operated with one hand only, and the vacuum being formed within this head, as will be made clear presently.

According to a specific form of embodiment of the invention, this head is adapted to operate as a valve box.

Atmospheric air may be allowed into the cup member if desired by providing in the head of the pump body a small valve controlled by a milled button or the like.

Other specific features are provided by this invention, such as a cup member constituting a magnifying glass, a Bourdon gage and wire means associated therewith for operating its indicating needle, the unitary mounting of the Bourdon gage with the cup member, and disc-like valves each cooperating with a pair of seats, one seat being plain and the other corrugated, so as to derive the maximum benefit from the arrangement of parts broadly set forth hereinabove.

Other features and advantages of this invention will appear as the following description proceeds with reference to the accompanying drawings forming part of this specification and illustrating diagrammatically by way of example one form of embodiment of the invention. In the drawings:

Fig. 2 is an axial section of the pump;

Fig. 3 is an axial sectional detail view of one of the pump valves; and

Figs. 4 and 5 are a cross-sectional view and an axial sectional view of the cup member and vacuum-gage assembly.

Figure 1:
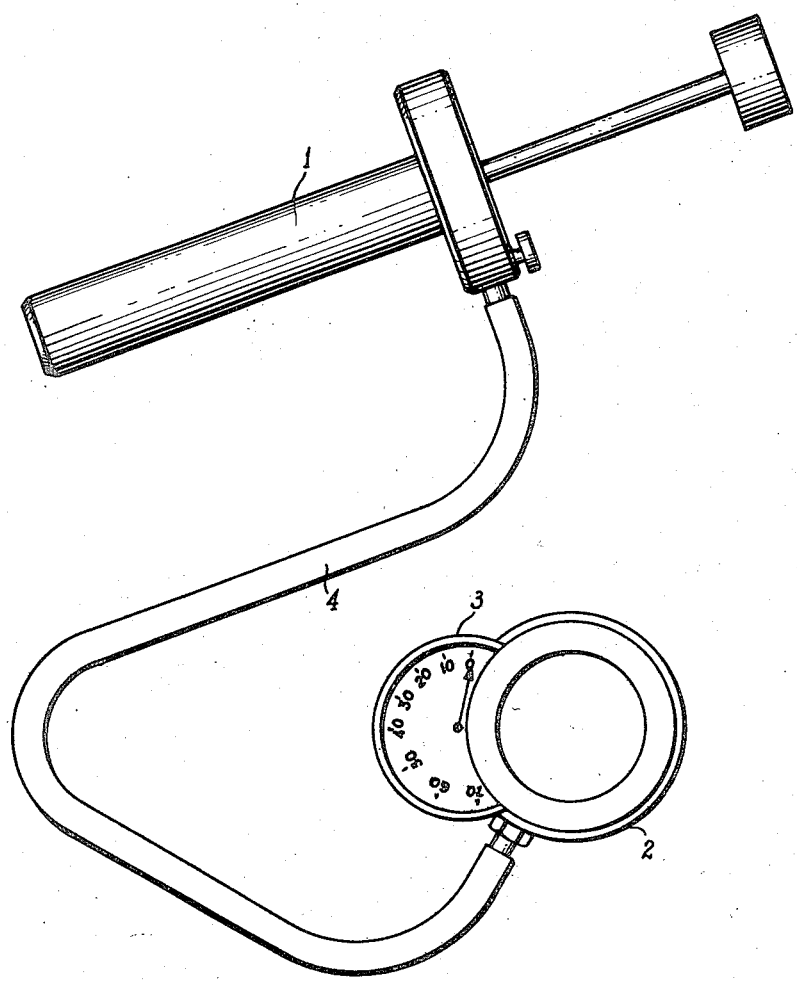
Fig. 1 is a complete view of the apparatus according to this invention.

As shown in Fig. 1, the apparatus according to this invention comprises a pump 1, a cup member 2, a vacuum-gage 3 forming a unit with the cup member 2, and a flexible pipe 4 connecting the cup member to the pump.

This pump (Fig. 2) includes a cylinder 5 having slidably mounted therein a piston 6 having a rod projecting from one end of the cylinder and formed with a push-button head 7. This cylinder 5 is formed at the opposite end with an orifice 8 and the piston-rod receiving end is provided with a screwed or otherwise secured head 9 formed with a central bore through which the piston rod is adapted to slide. Adequate sealing means are provided to prevent any air from leaking in or out through the piston-rod passage at the head 9. A compression spring 10 urging the piston toward the head 9 is fitted in the cylinder 1, as shown.

The head 9 has mounted therein a pair of pump valves 11, 12, the former permitting any air trapped in the pump to be vented to the atmosphere when the push-button 7 is released, whilst the other valve 12 is connected to the fitting 13 of the flexible pipe 4 to enable the cup member 2 to communicate with the pump body when a vacuum is produced therein by depressing the push-button 7.

Each valve comprises a disc-like member 14 (see Fig. 3) located freely in a valve chamber 15 and adapted to engage either one of a pair of seats 16, 17; one seat 16 is plain to enable the valve disc to close the passage completely, and the other seat 17 is corrugated, scored or grooved to enable the air to flow in either direction therethrough. In other words, when the differential pressure created between the valve disc faces causes these discs to engage their plain seats, no air can flow through the valves, and conversely when these valves engage their corrugated seats the air will flow freely therethrough. Thus, when the operating button 7 is depressed to compress the spring 10 the disc of valve 11 is seated on its plain seat and the system is isolated from the outer atmosphere, whilst the disc of valve 12 is seated on its corrugated seat, and the cup member 2 applied on the patient's skin is subjected to a vacuum. Conversely, when the operating button 7 is released, the disc of valve 11 engages its corrugated seat and the cylinder is vented to the atmosphere, whilst the disc of valve 12 engages its plain seat, thus isolating the cup member and creating a certain vacuum therein.

When it is desired to suppress the vacuum or reduce its value in the cup member, the head 9 has screwed therein a milled button or the like 18, adapted to engage a disc controlling the ingress of a traverse duct 19 leading to the passage in the fitting 13. When the button 18 is screwed home the disc actuated thereby will close the duct 19, and when the button 18 is unscrewed the disc is moved outwardly and the atmospheric air allowed into the duct 19.

As shown in Figs. 4 and 5, the cup member and vacuum-gage assembly comprises a case 20 acting as a support to the cup member proper 2 and to the vacuum gage 3. The cup member is made of transparent material and shaped to form at its top portion a magnifying glass 21. The inner space of the cup member communicates directly with the flexible pipe 4 through a fitting 23. Between the case 20 and the outer wall of the cup member 2 there is disposed the flattened or Bourdon tube 22 constituting the vacuum responsive element of the vacuum-gage. The free end of this tube is attached through a wire 27 to the index pivot 24. The index or indicating needle 25 of the measuring instrument is movable in front of a suitable graduated dial (Fig. 1). The wire 27 may be secured by providing on the index pivot 24 a portion of greater diameter in which an orifice is formed for introducing the wire end. A spring 26 is provided to urge the wire in its stretched condition.

Operation

The operator holds the pump in one hand and applies the cup member on the patient's skin with the other hand while turning the vacuum gage in the direction best suited for its reading.

After a few strokes of the pump, the cup member adheres to the skin without any other assistance. The vacuum-gage index is brought to the desired value by further actuating the pump and the formation of red spots is observed through the magnifying-glass forming top wall of the cup member 2. The value read at this point is the maximum vacuum required to produce the appearance of red spots after a predetermined time period.

When it is desired to reduce the vacuum to either adjust same to a lesser value or remove the cup member without any wrenching action, it will be sufficient to screw out the milled head 18, thereby allowing atmospheric air into the system.

Of course, the invention is not restricted to the form of embodiment shown and described therein, as many modifications and alterations may be brought thereto without departing from the spirit and scope of the invention which are set forth in the appended claims.

What I claim is:

1. An apparatus for measuring the resistance of capillary blood-vessels, comprising a reciprocating pump giving the required vacuum values, a cup member applicable onto the patient's skin, a vacuum-gage forming an integral unit with said cup member, a pipe connecting said cup member to said pump, a hollow head formed at or secured to one end of the body of said pump, a piston slidably mounted in said cylinder, a piston rod, sealing means interposed between said piston rod and said head to permit the sliding movement of said rod through said head whilst preventing air from leaking in or out of said head, said head being designed to enable the pump to be operated by a single hand, said cup member communicating with said pump through said hollow head, and valve means in said head which are operated pneumatically by said pump piston.

2. An apparatus according to claim 1, wherein said valve means consist of discs or plates each adapted to engage either one of two seats, one seat being plain and the other corrugated or grooved to permit the ingress or delivery of air irrespective of the valve position.

3. An apparatus for measuring the resistance of capillary blood-vessels, comprising a cup member applicable onto the patient's skin, a vacuum-gage forming an integral unit with said cup member, a pump independent of said unit which supplies the required vacuum values, and a pipe connecting said unit to said pump whereby the resistance may be precisely and continuously measured.

4. An apparatus for measuring the resistance of capillary blood-vessels, comprising a pump giving the required vacuum values, a cup member applicable onto the patient's skin, a vacuum-gage forming an integral unit with said cup member, a pipe connecting said cup member to said pump, a hollow head upon said pump and a small valve disc operated through a milled button or the like mounted in said hollow head to permit a controlled ingress of atmospheric air into said cup member.

5. An apparatus according to claim 3, wherein said vacuum gage comprises a Bourdon tube, the free end of which is connected, through a flexible connection, to an index pin which is moving across the dial of said vacuum-gage.

6. An apparatus according to claim 3 for measuring the resistance of capillary blood-vessels, comprising a cup member applicable onto the patient's skin and acting as a magnifying glass, a vacuum-gage consisting in a Bourdon tube located in and forming an integral unit with said cup member while remaining constantly outside the field of said magnifying glass, a pump independent of said unit which supplies the required vacuum values and a pipe connecting said unit to said pump.

References Cited in the file of this patent

UNITED STATES PATENTS

| 2,591,443 | Larson | Apr. 1, 1952 |

FOREIGN PATENTS

| 678,407 | France | Dec. 24, 1929 |
| 640,809 | Great Britain | July 26, 1950 |